Figure 1:
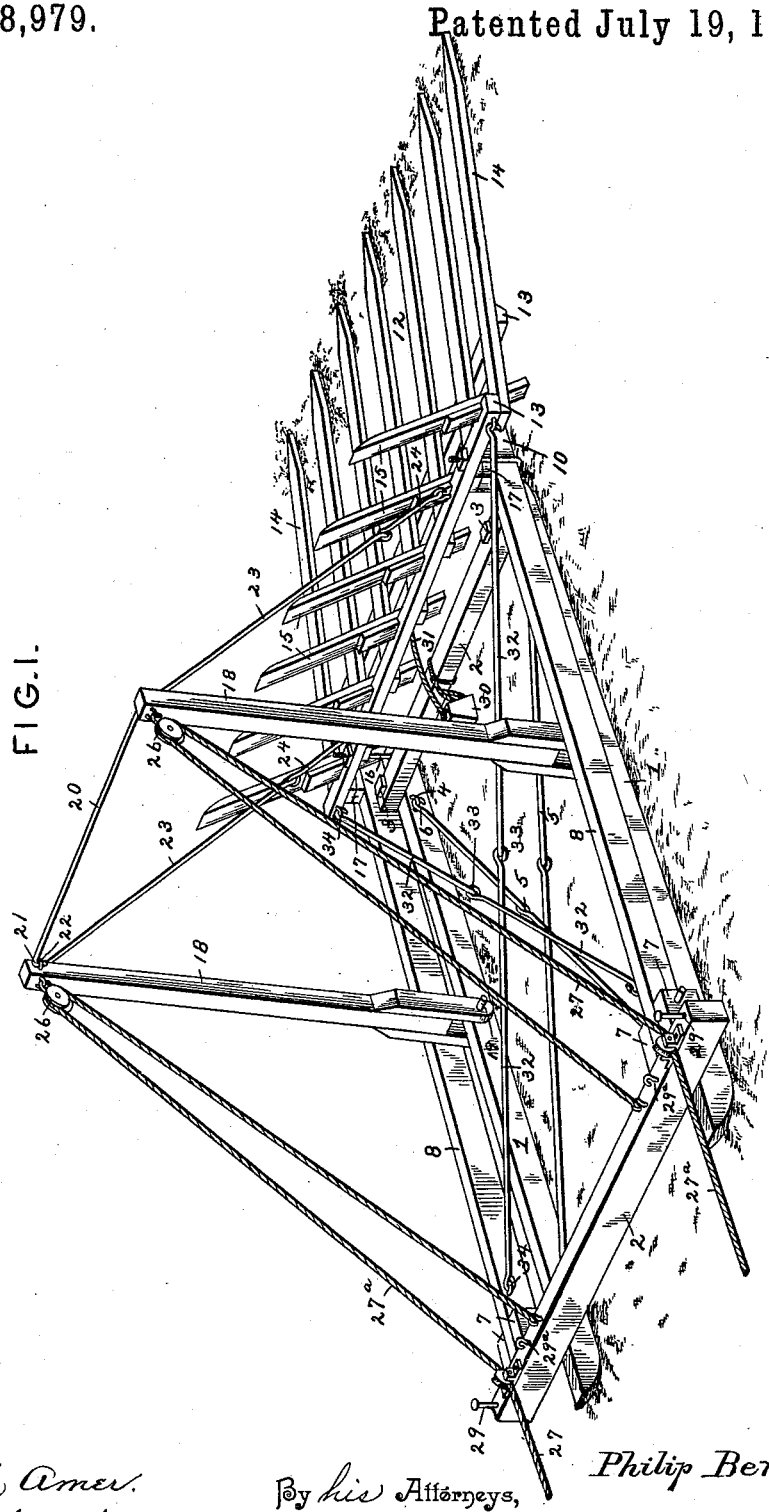

(No Model.)  2 Sheets—Sheet 1.
P. BERNARD.
HAY STACKER.

No. 478,979. Patented July 19, 1892.

Witnesses
Harry L. Amer.
D.P.Wolhaupter.

Inventor
Philip Bernard.
By his Attorneys,
C.A.Snow & Co.

(No Model.) 2 Sheets—Sheet 2.
P. BERNARD.
HAY STACKER.
No. 478,979. Patented July 19, 1892.
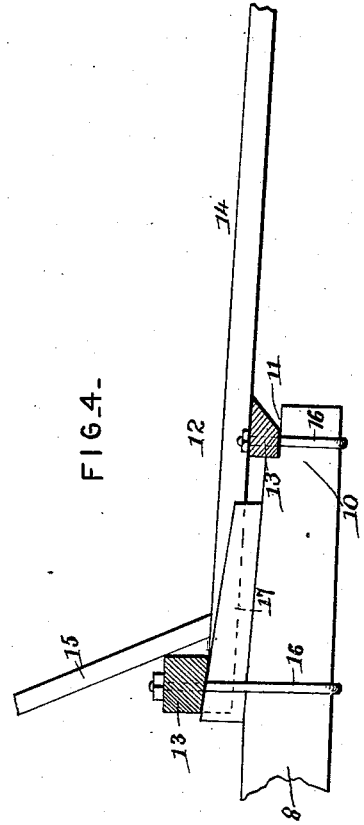
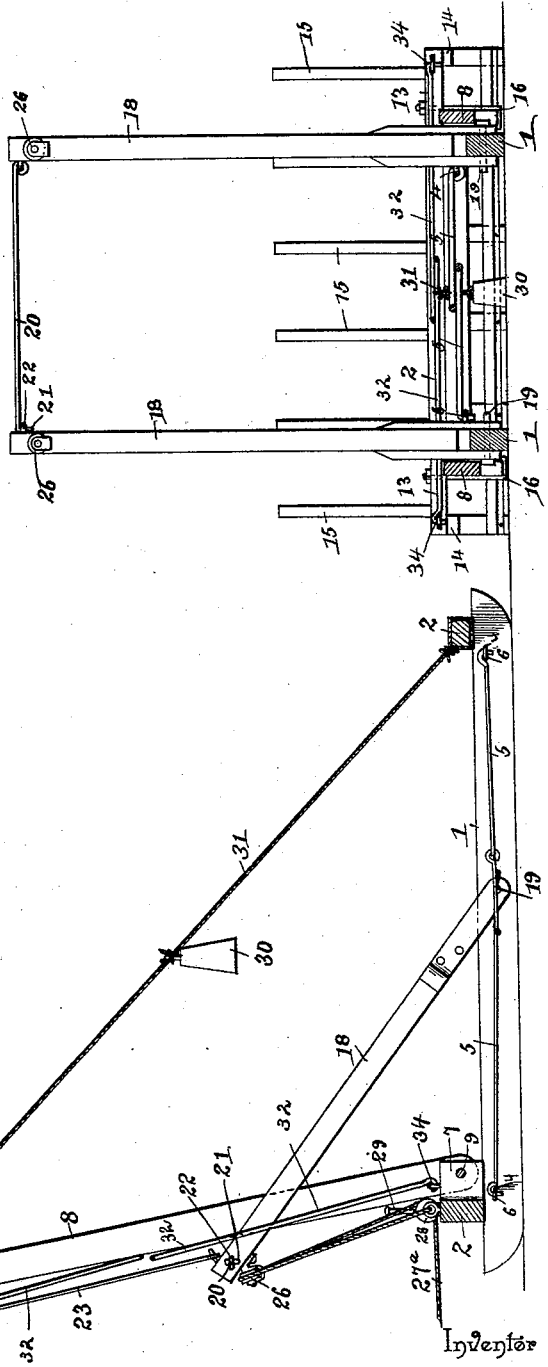
Witnesses
Jas. K. M?Cathman
N. T. Collamer
Inventor
Philip Bernard
By his Attorneys,
C. A. Snow & Co.

UNITED STATES PATENT OFFICE.

PHILIP BERNARD, OF JEFFERSON, SOUTH DAKOTA.

HAY-STACKER.

SPECIFICATION forming part of Letters Patent No. 478,979, dated July 19, 1892.

Application filed September 8, 1891. Serial No. 405,071. (No model.)

*To all whom it may concern:*

Be it known that I, PHILIP BERNARD, a citizen of the United States, residing at Jefferson, in the county of Union and State of South Dakota, have invented a new and useful Hay-Stacker, of which the following is a specification.

This invention relates to hay-stackers, and has for its object to provide a machine of this class which can be easily transported from field to field and which is so constructed as to allow for a ready detachment of all the constituent parts thereof for the purposes of transportation and storing away, and also a stacker which will easily elevate and stack the hay with but a small expenditure of power and which will work equally as well whether the strain or weight of the hay is equally or unequally distributed upon the elevating fork; and with these and other objects in view the invention consists in the novel construction hereinafter more fully described and claimed.

In the accompanying drawings, Figure 1 is a perspective view of a hay-stacker constructed in accordance with my invention, the fork being lowered. Fig. 2 is a longitudinal section of the same, the fork being elevated. Fig. 3 is a vertical transverse section of the stacker, the fork being lowered from the balancing posts or uprights. Fig. 4 is a detail sectional view illustrating the means for securing the forks to the elevating-arms.

Referring to the accompanying drawings, 1 1 designate parallel runners, upon which the stacker is mounted and carried. Said runners are connected and braced at their outer ends by the end beams 2, securely bolted thereto by the bolts 3, and are provided at their inner ends with the eyebolts 4, which are detachably engaged by the jointed diagonal braces 5, terminating in hooked ends 6, engaging said eyes, and providing means whereby the runners and the end beams may be easily taken apart for the purposes set forth. Between the inwardly-extending perforated lugs 7 upon one of the end cross-beams 2 is pivotally secured the long parallel fork-arms 8, the pivotal connection thereof being upon the bolt 9, passing therethrough and said perforated lugs, and which also allows for the ready detachment of the fork-arms. The outer ends of said arms are provided with the reduced portions 10 and the shoulders 11, located upon their extremes, and upon said ends is designed to be removably secured the hay-fork 12. The said fork is of ordinary construction, being provided with the usual cross-bars 13, to which are secured the forwardly-extending tines 14 and also having the supplemental hay-retaining tines 15, said fork-bars 13 being provided near each end with the downwardly-extending U-shaped clip-bolts 16, that are adapted to engage over the tapered ends of the elevating fork-arms, the front bar 13 being adapted to be seated within the shoulders 11 at the ends of the said arms, while the fork is securely held upon the arms by means of suitable wedges 17, secured upon the tapered ends of said arms and upon which the rear cross-bar 13 is designed to firmly wedge.

Elevating uprights or standards 18 are pivotally secured upon the bolts 19 to the center of the parallel runners 1. The said uprights are loosely connected together at their upper ends by means of the connecting-rod 20, loosely secured to one end of one of said uprights and provided with a hooked end 21, that is designed to detachably engage the eyebolt 22, secured in the end of the opposite upright, and said standards are braced in such a manner to insure regularity in elevating the fork. Fork-rods 23 are loosely connected to the front upper ends of each of said uprights, and are provided at their lower ends with the links 24, that are adapted to engage the hooks 25 upon the rear cross-bar 13 of said fork, affording a detachable connection between said fork and elevating-uprights. To the opposite upper ends of each elevating upright or standards directly opposite to the fork-rods are loosely and detachably secured in any suitable manner ordinary pulleys 26, over which work the operating-ropes 27 and 27$^a$, extending from said pulleys under the supplemental guide and hoisting-pulleys 28 and suitably connected to the rear end beam 2, secured to one end of the opposite runners. The said operating-ropes, as can be readily seen, are connected independently of each other with the hoisting standards or uprights, and as the same are operated simultaneously or not, as the case may be, with each other, any unevenness of weight upon either side of the hay-fork is immaterial, and the same will be evenly hoisted up to its point of discharge.

For convenience of keeping the various parts of the stacker when in its dissembled condition together, pins 29 and hooks 29<sup>a</sup> are secured to the rear end beam 2, thus providing means whereby the removable pulleys 26, which may be detached in shipping or moving the stacker when taken apart, can be conveniently located by hooking the same over the pins or hooks. After the fork has been elevated to its almost vertical position, at which point the contents thereof are discharged, the same is immediately withdrawn to its normal lowered position by means of the weight 30, secured to the rope 31, the ends of which are connected to the bottom of said fork and the front end beam 2, respectively. Diagonal bracing rods or wires 32 are secured to opposite sides of said fork-arms and, crossing each other between the opposite uprights above the wires 5, are connected diagonally to opposite ends of the rear cross-bar 13 of the fork, thus additionally bracing the fork and the elevating-arms carrying the same and also preventing the fork from becoming displaced and holding it rigidly upon the outer ends of the fork-arms. The said wires are jointed, as at 33, and are loosely connected at one end to the opposite fork-arm near their points of pivot, while the other hooked ends thereof detachably engage the eyes 34 at opposite rear ends of the fork in order that the fork may be removed from the arms when desired. It will of course be observed that the rods 23 also have to be disengaged from the fork-bar when such removal takes place.

The construction and operation of my improved stacker are now thought to be apparent without further description.

Having thus described my invention, what I claim, and desire to secure by Letters Patent, is—

In a hay-fork, the combination, with a runner-frame, of parallel fork-arms pivoted on opposite sides and at one end of said frame and provided with reduced outer tapered ends having squared shoulders at their extremities, opposite swinging standards pivoted at their lower ends between said fork-arms and to opposite sides of the runner-frame, a transverse connecting-rod loosely connected to the upper end of one of said standards and detachably to the opposite standard, wedge-blocks resting upon the tapered ends of said arms, the fork having front and rear cross-bars above and below the tines thereof, respectively, the front bar resting in said outer shoulders and the rear bar upon said wedge-blocks, clip-bolts encircling the tapered ends of the fork-arms and clamped to said bars to hold them to their respective places, diagonal jointed brace and securing rods loosely connected at one end to the fork-arms near their pivotal points and removably connected at their other ends to the rear cross-bar of the fork, fork-rods loosely connected to said opposite standards and detachably to said rear cross-bar, and means for moving said standards to elevate and lower the fork, substantially as set forth.

In testimony that I claim the foregoing as my own I have hereto affixed my signature in the presence of two witnesses.

PHILIP BERNARD.

Witnesses:
JNO. KENNEY.
ROMEO PINARD.